March 22, 1927.
G. S. CLARKSON
RACK FOR DISHWASHING MACHINES
Filed Sept. 25, 1923    3 Sheets-Sheet 1
1,621,830
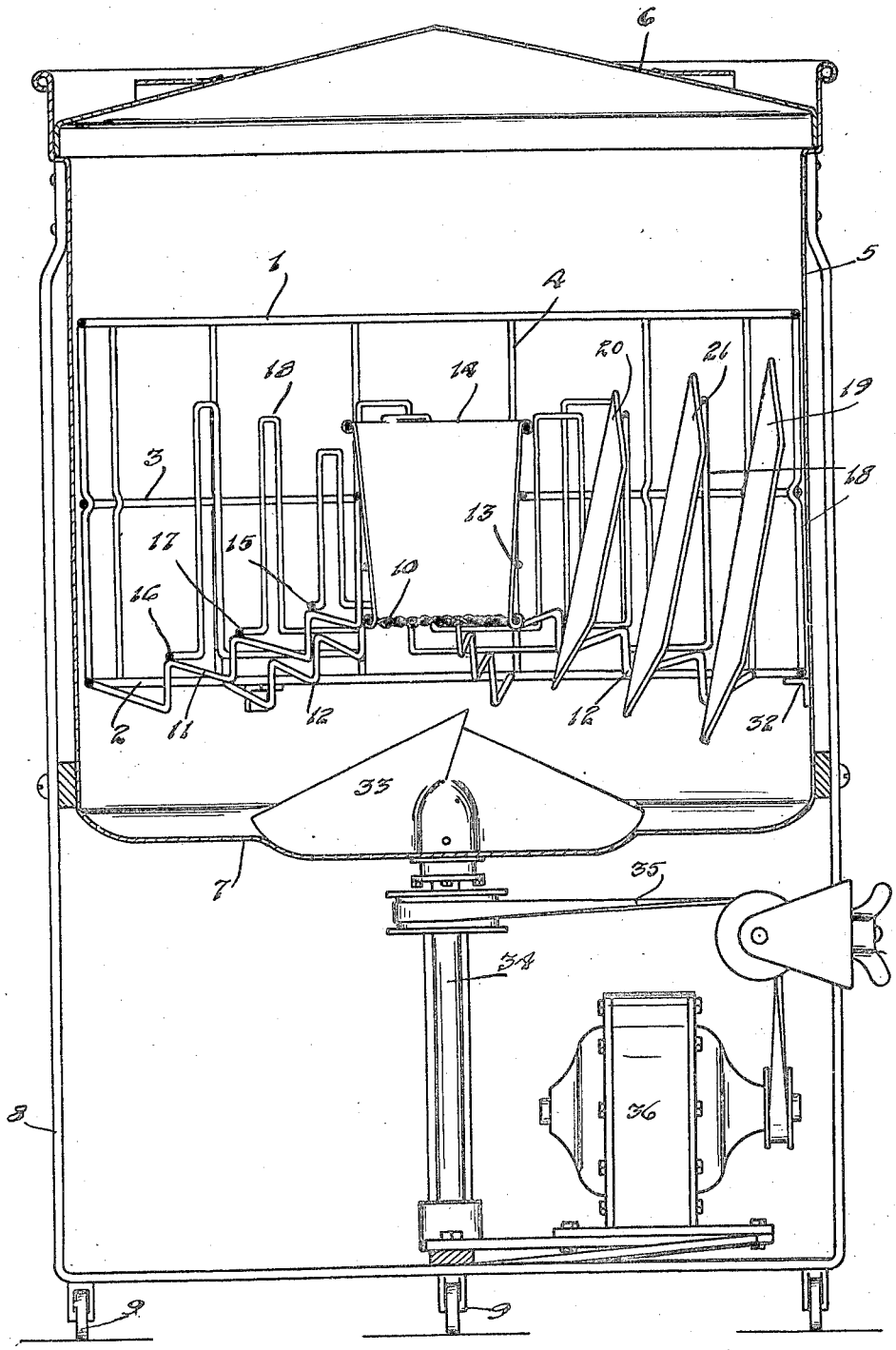
Inventor
G. S. Clarkson March 22, 1927. 1,621,830
G. S. CLARKSON
RACK FOR DISHWASHING MACHINES
Filed Sept. 25, 1923    3 Sheets-Sheet 2
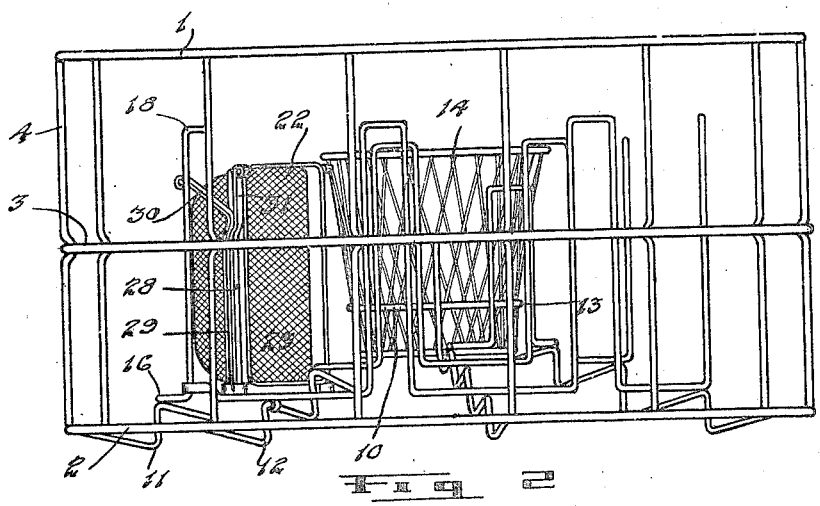
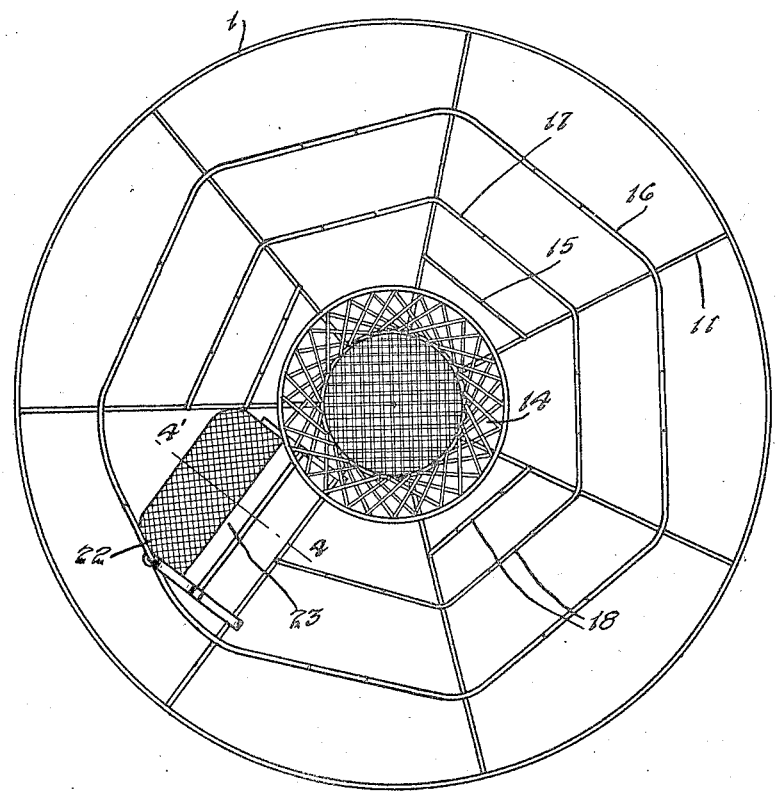
Inventor
G. S. Clarkson March 22, 1927. 1,621,830
G. S. CLARKSON
RACK FOR DISHWASHING MACHINES
Filed Sept. 25, 1923   3 Sheets-Sheet 3

INVENTOR
G. S. Clarkson
By
ATTYS

Patented Mar. 22, 1927.

1,621,830

UNITED STATES PATENT OFFICE.

GUY S. CLARKSON, OF WINNIPEG, MANITOBA, CANADA, ASSIGNOR TO DAVID R. FINKELSTEIN, OF WINNIPEG, MANITOBA, CANADA.

RACK FOR DISHWASHING MACHINES.

Application filed September 25, 1923, Serial No. 664,762, and in Canada August 2, 1923.

The invention relates to improvements in racks for dish washing machines and an object of the invention is to provide a rack which will hold a considerable quantity of dishes of varying sizes and which is designed such that the dishes are held in fixed spaced relation one to the other so that the water used in washing the dishes is free to travel at a considerable velocity between the dishes and by so doing effectively wash both sides thereof.

A further object is to construct the rack so that the dishes are held in an inclined position and approximately in parallelism and such that they cannot close together and stop the current of passing water.

A further object is to construct an open rack which will not impede the passage of the water and one which is light, strong and comparatively inexpensive to make.

A further object is to construct a rack having a separate removable receptacle for knives, spoons, forks and such like, and further, to provide the rack with a strainer which will catch and collect any solid matter suspended in the washing water.

A still further object is to construct a rack in which bottles, such as milk bottles, can be washed.

With the above more important objects in view the invention consists essentially in the arrangement and construction of parts hereinafter more particularly described, reference being had too the accompanying drawings in which:

Fig. 1 is a vertical sectional view centrally through a dish washing machine containing my rack.

Fig. 2 is a side view of the rack.

Fig. 3 is a plan view of the rack.

In the drawings like characters of reference indicate corresponding parts in the several figures.

Figure 4:
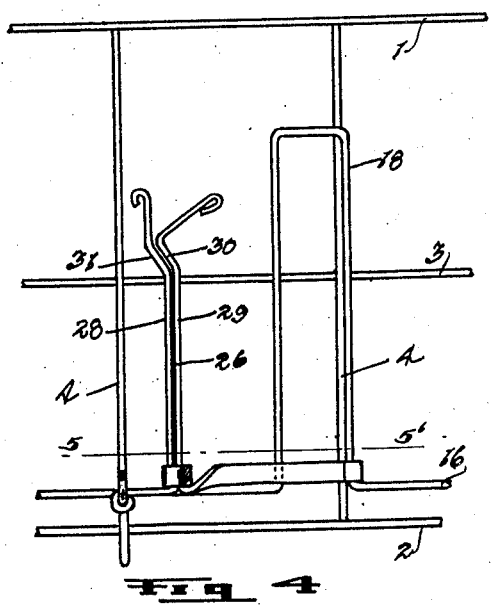
Fig. 4 is an enlarged detailed sectional view at 4—4' Figure 3 looking outwardly of the rack.

The dish washing rack is formed preferably from wire in the form of an open frame work. Upper, lower and intermediate wire rings or hoops 1, 2 and 3 of equal diameter are provided and these are connected together by suitably spaced vertically disposed stay wires 4 secured to the rings, as by spot welding. This construction provides an outer cylindrical cage and the cage is of such dimension that it can be readily inserted within the upper end of the cylindrical metallic casing or tank 5 of the dish washing machine, which casing is fitted with a removable cover 6 and has the bottom thereby closed as indicated at 7. The casing is suitably supported on legs 8 which are carried by casters 9.

Centrally within the cage I locate an inner relatively small ring 10 which is contained within a horizontal plane situated somewhat above the plane containing the lower ring 2.

A plurality of similar radially disposed supporting wires or rods 11 connect the outer ring 2 with the inner ring 10 and these latter rods are bent at suitable intervals to provide a plurality of similar inclined V-shaped pockets 12. The pockets of the various rods are opposed to provide outer, inner and intermediate sets of supports for large, small and intermediate sizes of plates.

Figure 6:
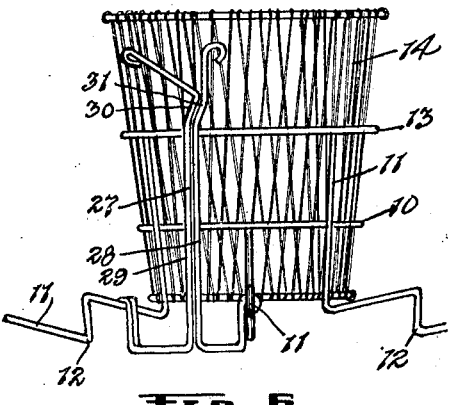
Fig. 6 is an enlarged detailed sectional view at 4—4' Figure 3 and looking inwardly of the rack.
Figure 5:
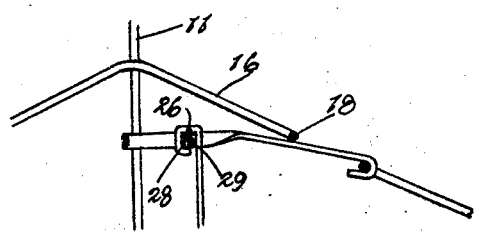
Fig. 5 is a horizontal sectional view at 5—5' Figure 4.
Figure 7:
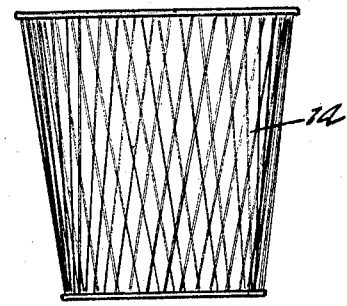
Fig. 7 is a side view of the basket.
Figures 9, 10, 11:
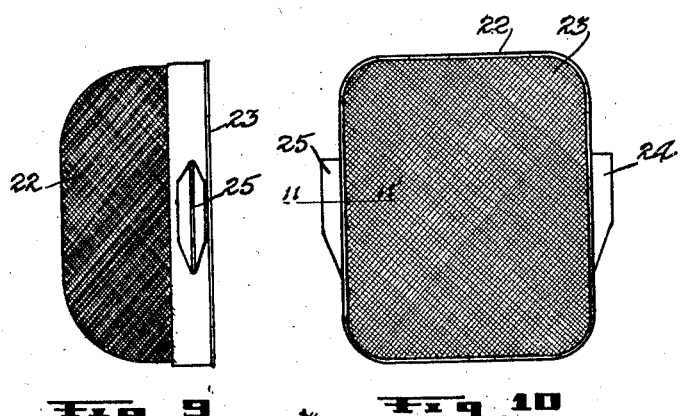
Fig. 9 is a side view of the strainer.
Fig. 10 is a front view of the strainer.
Fig. 11 is a vertical sectional view at 11—11' Figure 10.
Figure 8:
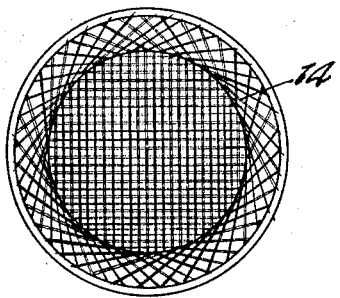
Fig. 8 is a plan view of the basket.

The inner ends of the alternate rods 11 are extended upwardly beyond the ring 10 to support the upper inner ring 13 slightly larger than the ring 10. The rings 10 and 13 form a holder for an open wire basket 14, the details of which are shown so clearly in Figures 6, 7 and 8 that it is not considered necessary to further describe the same. In this basket the knives, forks, spoons and such like to be washed are placed end on.

To the wires 11 I secure permanently inner, outer and intermediate equi-spaced wires 15, 16 and 17 which pass in a general direction concentric to the basket and are fastened in each instance to the wires 11 in a location directly above the pockets 12. The wires 15, 16 and 17 are all provided centrally between the wires 11 with upstanding narrow loops 18 which form arms for supporting the plates, as later described, and are also of such width that they will pass into the neck of a bottle, such as a milk bottle. The loops gradually decrease in length in passing from the outside to the inside of the basket and they appear in radial positions in respect to the basket.

The dishes customarily washed in a dish washing machine vary, but the sizes are usually regular, that is to say, there are large, small and intermediate plates 19, 20 and 21, such as dinner plates, saucers and tea plates. The large plates are stacked in the outer part of the rack, small plates in the inner part of the rack and intermediate plates in the intermediate part of the rack and in all instances the lower edge of each plate rests in the lower end of two pockets and has the back thereof engaging the adjoining vertical loop or arm 18. According to the arrangement provided the inner, outer and intermediate sets of plates take an inclined position, as shown in Figure 1, and here it will be observed that their edges are approximately parallel and they have their upper edges tilted outwardly. I wish particularly to point out that the shape of the pockets 12 and the weight of the dishes thus effectively prevent the inserted dishes from changing their relative position when the machine is in use.

As there is usually a certain amount of solid material adhering to the plates which is subsequently washed off, it is desirable to collect this, if possible, so that it may not remain lodged on the plates after the dishes have been washed. I accomplish this by placing in the rack a strainer 22 which is positioned more or less tangential to the inner ring 10 and has the open side or mouth 23 thereof in the vertical plane and directed toward the spiralling flow of water coming up through the rack. The strainer is supported in the following manner: it is provided at the side with two outstanding vertically extending wings 24 and 25 and these wings are adapted to enter vertically extending opposing guide slots 26 and 27 appearing between upwardly extending pairs of spaced guide bars 28 and 29 carried by the rods 11. The upper ends of the guide bars are laterally deflected as indicated at 30 and 31, to prevent the wings from rising when the strainer is subjected to the pressure of the water.

The rack is suitably supported within the casing 5 by angle brackets 32 attached to the sides of the casing.

In order that the value of the rack may be better appreciated I have shown the propeller or double winged blade 33 which I use in the bottom of the casing, the blade being carried by a vertically disposed suitably mounted shaft 34 driven by a belt 35 from the motor 36. This blade and driving mechanism forms the subject matter of a separate patent application and accordingly the same are not herein described in detail.

When the machine is in use the propeller operates at comparatively high speed and thrusts the water originally placed in the lower part of the casing in an upward and outward direction, the water spirals as it rises. The general direction of travel of the water is upwardly between the plates and the plates in no way baffle the flow of water. Accordingly they are effectively washed on both sides and the velocity of the passing water is not abruptly killed by the plates. In this connection I might point out that the plates are suspended in a position substantially at right angles to the upper edges of the blades. The forks, knives and spoons are effectively washed by a comparatively fine spray appearing in the central part of the tank and any foreign material suspended in the water is caught by the strainer which is opposed to the spiral direction of travel of the water and accordingly in the time that it takes to wash the dishes has sufficient time to catch practically all of the solid material contained in the tank.

What I claim as my invention is:

1. A plate supporting rack having spaced, upwardly inclining, plate supporting rods and with the rods bent to present opposing pockets contained in vertical planes and adapted to receive the lower edges of the standing plates with the lower edge of each plate resting in two adjacent pockets and having the rod portions forming the pockets inclined to cant the upper edges of the plates in a direction away from the upper ends of the rods and upstanding stationary arms interposed between adjacent rods and engaging the upper edges of the several plates and supporting them in their canted position.

2. A plate supporting rack having the bottom thereof closed by spaced, upwardly inclining, radiating rods, the rods being bent to present opposing pockets contained respectively in the vertical planes containing the rods and adapted to receive the lower edges of standing, out canted plates with the lower edge of each plate resting in two adjacent pockets and upstanding stationary arms interposed between adjacent rods and engaging the upper edges of the several plates and supporting them in the out canted position.

3. A cylindrical plate supporting rack having the bottom thereof closed by radially extending and upwardly inclining, spaced, plate supporting rods, the rods being similarly bent at intervals to provide a plurality of opposing, similar, acute angled pockets contained in the vertical planes containing the rods and adapted to receive and support the lower edges of out canted plates and stationary upstanding arms interposed between adjacent rods and engaging the upper edges of the out canted plates and supporting the same in such position.

4. A cylindrical plate supporting rack having the bottom closed by upwardly inclining, radially disposed, suitably spaced, plate supporting rods and having the rods bent to provide downwardly extending, acute angled pockets and having the apices of the pockets pointing inwardly toward the axis of the cylindrical rack, the opposing pockets of adjacent rods being adapted to receive and support the lower edge of a plate and hold the plate in an out canted position and upstanding stationary arms interposed between adjacent rods and engageable with the upper edges of the several plates and supporting them in their out canted position.

Signed at Winnipeg, this 10th day of July, 1923.

GUY S. CLARKSON.